(12) United States Patent
Deivasigamani et al.

(10) Patent No.: US 11,891,317 B2
(45) Date of Patent: Feb. 6, 2024

(54) HEATING SYSTEM

(71) Applicant: Intellihot, Inc., Galesburg, IL (US)

(72) Inventors: Sridhar Deivasigamani, Peoria, IL (US); Sivaprasad Akasam, Dunlap, IL (US)

(73) Assignee: Intellihot, Inc., Galesburg, IL (US)

( * ) Notice: Subject to any disclaimer, the term of this patent is extended or adjusted under 35 U.S.C. 154(b) by 149 days.

(21) Appl. No.: 17/467,528

(22) Filed: Sep. 7, 2021

(65) Prior Publication Data

US 2022/0073387 A1  Mar. 10, 2022

Related U.S. Application Data

(63) Continuation-in-part of application No. 17/016,471, filed on Sep. 10, 2020.

(51) Int. Cl.
*C02F 1/78* (2023.01)
*C02F 1/02* (2023.01)
*F24D 19/10* (2006.01)

(52) U.S. Cl.
CPC .............. *C02F 1/78* (2013.01); *C02F 1/02* (2013.01); *F24D 19/1051* (2013.01); *C02F 2201/782* (2013.01); *C02F 2303/04* (2013.01)

(58) Field of Classification Search
USPC ........................................................ 210/76
See application file for complete search history.

(56) References Cited

U.S. PATENT DOCUMENTS

| | | |
|---|---|---|
| 2010/0209084 A1 | 8/2010 | Nelson et al. |
| 2014/0026970 A1* | 1/2014 | DuPlessis ............ G05D 23/132 236/12.15 |
| 2014/0352799 A1* | 12/2014 | Rosko ....................... C02F 1/78 137/237 |
| 2019/0128565 A1 | 5/2019 | Pugh et al. |

* cited by examiner

*Primary Examiner* — Steven B McAllister
*Assistant Examiner* — John E Bargero
(74) *Attorney, Agent, or Firm* — Jong Patent Firm; Cheng Ning Jong; Tracy P. Jong

(57) ABSTRACT

A sanitizing system for sanitizing a water flow at a point of use, the sanitizing system including an ozone demand indicator configured for determining the existence of a demand for ozone in the water flow; an ozone generator configured to be disposed no more than about 72 inches upstream of the point of use on a fluid conductor supplying the water flow at the point of use, wherein ozone generated by the ozone generator is configured to be disposed in the water flow to sanitize the water flow; and a controller operable to control the ozone demand indicator and the ozone generator responsive to the ozone demand indicator, wherein the controller is configured to cause the ozone generator to start generating ozone upon receiving an indication from the ozone demand indicator that the demand for ozone exists.

8 Claims, 8 Drawing Sheets

HEATING SYSTEM

PRIORITY CLAIM AND RELATED APPLICATIONS

This continuation-in-part application claims the benefit of priority from non-provisional application U.S. Ser. No. 17/016,471 filed on Sep. 10, 2020. Said application is incorporated by reference in its entirety.

BACKGROUND OF THE INVENTION

1. The Field of the Invention

The present invention relates to a heating system. More specifically, the present invention is directed to an under sink heat pump.

2. Background Art

Various fossil fuel phase-out initiatives have been made in the heating industry and mandates have been increasingly devised and implemented to phase out the direct or indirect use of fossil fuel in heat production for domestic and/or industrial uses. Attempts have been made to heat domestic water with alternative means, e.g., with the use of heat pumps having operations that are primarily driven using electricity in the form of pump or compressor operations. Supplemental electric heating elements may also be employed to aid fossil fuel-free domestic water heating systems in meeting heating demands. However, the need to meet heating demands have driven designers to return to tanked solutions which bring back the disadvantages associated with such solutions, one of the disadvantages being the exposure of stagnant domestic water disposed at temperature ranges suitable for *Legionella* proliferation when hot water demands are small, over extended periods. Two examples of tanked solutions are included herein where domestic hot water is supplied directly from a tank in each of these examples:

U.S. Pat. Pub. No. 20190128565 of Pugh et al. (hereinafter Pugh) discloses a heat pump water heater having a tank, a heat source and a heat pump system. The heat pump system has a refrigerant path, at least a portion of which is in thermal communication with the water tank volume such that heat transfers from a refrigerant to the water tank volume. A fan causes air to flow through a housing, and another portion of the refrigerant path includes an evaporator in the housing. The fan is within the housing and may further be within a second housing. The first housing may include a baffle to direct air flow. The fan may be a variable speed fan in communication with a controller, so that the controller controls the fan speed depending on a temperature of the refrigerant.

U.S. Pat. Pub. No. 20100209084 of Nelson et al. (hereinafter Nelson) discloses a heat pump water heater and systems and methods for its control. The systems are configured to heat water within a water storage tank of a heat pump water heater wherein a controller within the system is operatively connected to a plurality of heat sources including at least one electric heating element and a heat pump and sensors in order to selectively energize one of the plurality of heat sources. The controller is configured to process data representative of the temperature of water within the tank near the top of the water storage tank, and rate of water flowing out of the water storage tank, in order to automatically selectively energize the heat sources. The selection of heat sources by the controller is determined by a mode of operation selected by the user and the data processed by the controller in view of the selected mode of operation.

*Legionella* or more specifically *Legionella pneumophila*, commonly called legionellosis, has been the subject of numerous studies conducted in order to better understand agents having an effect upon the proliferation of this bacterium particularly at water heaters. Traditionally, in ascertaining the presence of *Legionella*, samples must be collected and tested for *Legionella*. According to https://www.pmengineer.com/articles/90962-legionella-and-water-temperatures-go-hand-in-hand, legionellosis survive at water temperature of 20 degrees C. (68 degrees F.) and under but dormant, grow between 20 degrees C. (68 degrees F.) and 50 degrees C. (122 degrees F.). Left at a temperature of about 55 degrees C. (131 degrees F.), legionellosis die within 5 to 6 hours. Left at a temperature of about 60 degrees C. (140 degrees F.), legionellosis die within 32 minutes. Left at a temperature of about 66 degrees C. (150.8 degrees F.), legionellosis die within 2 minutes. At 70 degrees C. (158 degrees F.) or above, legionellosis is killed. A water heating system typically experiences a wide range of water temperature as some hot water is left dwelling in the system before cooling down to room temperature of the mechanical room in which the water heater is disposed if demands are sporadic and infrequent. However, it is not always possible to collect and test for *Legionella* in a water supply system as the frequency and costs of testing can balloon quickly, making it economically unfeasible to do so. Further, *Legionella* can be present at points of use, e.g., faucets and shower heads. As such, ozone injection at a central location of a distributed water supply network is ineffective in combating *Legionella* that exist in the points of use as the ozone-sanitized water flow can be re-contaminated as it flows through the points of use due to the re-combinations of $O^3$ and oxygen atoms to form oxygen molecules.

Each of Pugh and Nelson discloses the use of a large thermal storage tank that accommodates demands of hot water. As each of Pugh and Nelson's tanks holds a significant amount of water to anticipate demands, there is no guaranty that all portions of the heated water in the tank will exit the tank and be replaced with fresh cold or unheated water. If insufficiently used and the water held in the tank is not consumed or replaced over a long period of time, *Legionella* can proliferate and the next user/s can be exposed to a heightened level of *Legionella* risk.

There exists a need for a heating system capable of reducing or eliminating the risk of *Legionella* transmission due to exposures to water supplies suitable for *Legionella* proliferation without requiring the water supplies to be tested for *Legionella* and without needing to halt the consumption of water supplies determined to be suitable for *Legionella* proliferation.

SUMMARY OF THE INVENTION

In accordance with the present invention, there is provided a sanitizing system for sanitizing a water flow at a point of use, the sanitizing system including:
 (a) an ozone demand indicator configured for determining the existence of a demand for ozone in the water flow;
 (b) an ozone generator configured to be disposed no more than about 72 inches upstream of the point of use on a fluid conductor supplying the water flow at the point of use, wherein ozone generated by the ozone generator is configured to be disposed in the water flow to sanitize the water flow; and (c) a controller operable to control the ozone demand indicator and the ozone generator responsive to the ozone demand indicator, wherein the controller is configured to cause the ozone generator to start generating ozone upon receiving an indication from the ozone demand indicator that the demand for ozone exists and to stop generating ozone upon receiving an indication from the ozone demand indicator that the demand for ozone no longer exists.

In one embodiment, the ozone demand indicator is a flow sensor configured to detect a presence of the water flow. In one embodiment, the ozone demand indicator is a timer configured to detect continuous non-existence of the water flow for at least a period of time. In one embodiment, the at least a period of time is about 1-2 hours. In one embodiment, the ozone demand indicator is a timer configured to detect cumulative non-existence of the water flow for at least a period of time. In one embodiment, the at least a period of time is about 3-6 hours. In one embodiment, the ozone demand indicator is a temperature sensor configured to detect a temperature of the water flow upstream of a heating system disposed upstream of the ozone generator, that falls within a range of temperature suitable for *Legionella* proliferation. In one embodiment, the range of temperature suitable for *Legionella* proliferation is about 20 degrees C. (68 degrees F.)-50 degrees C. (122 degrees F.). In one embodiment, the demand for ozone is based upon a predetermined duration. In one embodiment, the sanitizing system further includes an ozone sensor configured to obtain an ozone concentration level at the point of use such that a rate at which ozone is generated by the ozone generator can be adjusted based on the ozone concentration level.

In accordance with the present invention, there is further provided a heating system including:
  (a) a water conductor including an inlet and an outlet, the inlet configured for receiving a water flow;
  (b) a heater including an inlet and an outlet, the heater configured to be interposed between the inlet of the water conductor and the outlet of the water conductor;
  (c) an ozone demand indicator configured for determining the existence of a demand for ozone in the water flow;
  (d) an ozone generator configured to be interposed between the outlet of the heater and the outlet of the water conductor and disposed such that the outlet of the ozone generator and the outlet of the water conductor is less than about 72 inches, wherein ozone generated by the ozone generator is configured to be disposed in the water flow to sanitize the water flow; and
  (e) a controller operable to control the ozone demand indicator and the ozone generator responsive to the ozone demand indicator, wherein the controller is configured to cause the ozone generator to start generating ozone upon receiving an indication that the demand for ozone exists from the ozone demand indicator and to stop generating ozone upon receiving an indication from the ozone demand indicator that the demand for ozone no longer exists.

An object of the present invention is to provide a heating system for sanitized hot water or water at or near a point of use, e.g., a water supply exit point of a faucet or a shower head.

Another object of the present invention is to provide an automated system for sanitizing a water supply.

Another object of the present invention is to provide a heating system sufficiently compact to fit in the space underneath a sink or point of use.

Another object of the present invention is to provide a heating system capable of recovering heat energy otherwise left untapped and wasted.

Another object of the present invention is to provide a heating system powered using a minimal power plant with heating load ranging from several kilowatts to an upper limit of tens of kilowatts.

Another object of the present invention is to provide a heating system capable of providing hot water with a minimal delay, e.g., a delay of mere seconds.

Another object of the present invention is to provide a heating system powered only by electricity.

Another object of the present invention is to provide a heating system that is at least temporarily self-sustaining.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

PARTS LIST

Figure 1:
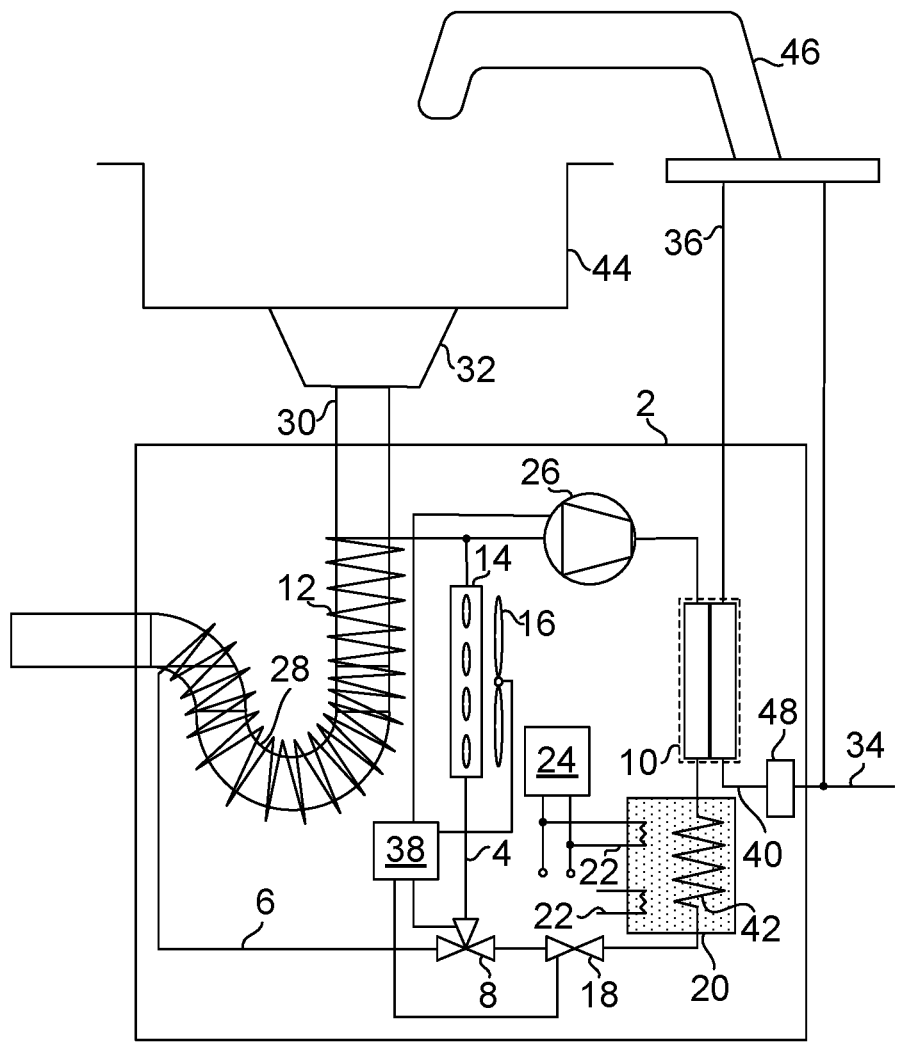
FIG. 1 is a diagram depicting an under sink heating system.

2—heating system
4—fluid circuit

6—fluid circuit
8—3-way valve
10—heat exchanger
12—heat exchanger, e.g., coil
14—heat exchanger
16—blower
18—expansion valve
20—tank
22—heating element
24—electric battery
26—compressor
28—J bend tube
30—drain tailpiece
32—drain fitting
34—water inlet
36—water outlet
38—controller
40—water conductor
42—portion of first or second fluid circuit disposed within bath of tank
44—sink
46—faucet
48—ozone generator
50—coil
52—effluent
54—heat transfer fluid, e.g., refrigerant
56—thermal paste
58—wall which contains thermal paste
60—section or half of coil
62—temperature sensor
64—heater
66—incoming flow
68—heated flow
70—sanitized heated flow
72—sanitized unheated flow
74—flow at tip of faucet
76—flow sensor
78—mixing valve
80—point of use
82—controller
84—ozone sensor

PARTICULAR ADVANTAGES OF THE INVENTION

The present heating system is capable of recovering heat energy from a drain to which the heating system is thermally coupled. When hot water is used in a sink, a tremendous amount of heated water which still contains a large amount of heat energy is drained down a drainage tube. Without a mechanism for recovering this effluent, a large amount of heat energy would be carried with the effluent into either a sewer or septic system and left untapped.

The present heating system can be provided close to a point of use, e.g., a sink. It therefore does not require long fluid conductors to send hot water from the point water is heated to a point where the hot water is consumed or used.

The present heating system does not include a tank for storing potable hot water in anticipation of a potable hot water demand. As such, no stratification of potable water held in a tank can occur. Although one or more temperature sensors may be used for providing feedback to heating of the contents of a tank water heater to achieve a setpoint temperature, the effect of stratification can cause layers of fluid having different temperatures in the tank water heater. Therefore, although portions of the contents of a water heater may be disposed at a setpoint temperature that is unfavorable for *Legionella* proliferation, there potentially exists other portions that may be disposed at temperatures suitable for *Legionella* proliferation, especially when the contents have been left unused for an extended period of time.

The present heating system is capable of storing heat energy harnessed from an around the heating system. In one mode, the present heating system is capable of storing heat energy harnessed from an indoor ambient of a heat exchanger. In one embodiment, supplemental or additional heat energy can be supplied by heating elements disposed within the bath of the present tank and powered by grid electricity, solar power means and wind power means. In one embodiment, hot water can be provided even in the event of an electric power failure as a demand of hot water can be met by heating in the incoming cold water supply with the heat energy stored in a tank.

As the present heating system includes a domestic water supply that is not fluidly connected to a tank characterized by a low flowrate within the tank, the present system significantly reduces the opportunity for a water flow to deposit scale within the water conductor of the system as the water flow occurs through fluid conductors of a smaller inner diameter instead of the significantly larger volume of a tank.

As the present heating system includes an electric battery, the present system reduces the downtime if grid power is down as the system continues to be operational even if grid power is unavailable. Further, the electric battery serves as a sink for electric grid power when its pricing is favorable or low or when the demand for grid power is low.

Hard water causes unwanted mineral deposits (scaling) on the fluid contact surfaces of the water heater system. Severe scaling can cause severe drop in the water heater efficiency and life span. Scale deposits in the interior surfaces of heat exchanger tubes can reduce the heat exchanger efficiency as the scale deposits reduce heat transfer rate from the exterior to the interior surfaces of the heat exchanger tubes. Therefore, more heat would be required to raise each degree of water temperature. Excessive scale deposits, or any other like issues, that cause reduced heat exchanger efficiency, can lead to overheating of the exterior surfaces of a heat exchanger resulting in a shortened heat exchanger service life. In addition to resulting in damage to the heat exchanger, overheating of the heat exchanger exterior surfaces leads to undue energy loss. As the contents or bath of the present tank is isolated from the domestic water delivered to an end user, the speed of a flow through the domestic water conductor is significantly higher than a flow through a tank, thereby reducing the likelihood that scaling can occur.

In one embodiment, as the present heating system is coupled with an ozone generator disposed within a short distance or within about 6 ft from the point at which water is received by a user at a faucet or shower head, the water exiting the faucet is sanitized without having an opportunity to be re-contaminated. Further, sanitization of the fluid conductor at such length is effective as the distance does not provide sufficient dwell time for the generated ozone to break down into oxygen atoms and oxygen molecules which would not provide any sanitization value.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 2:
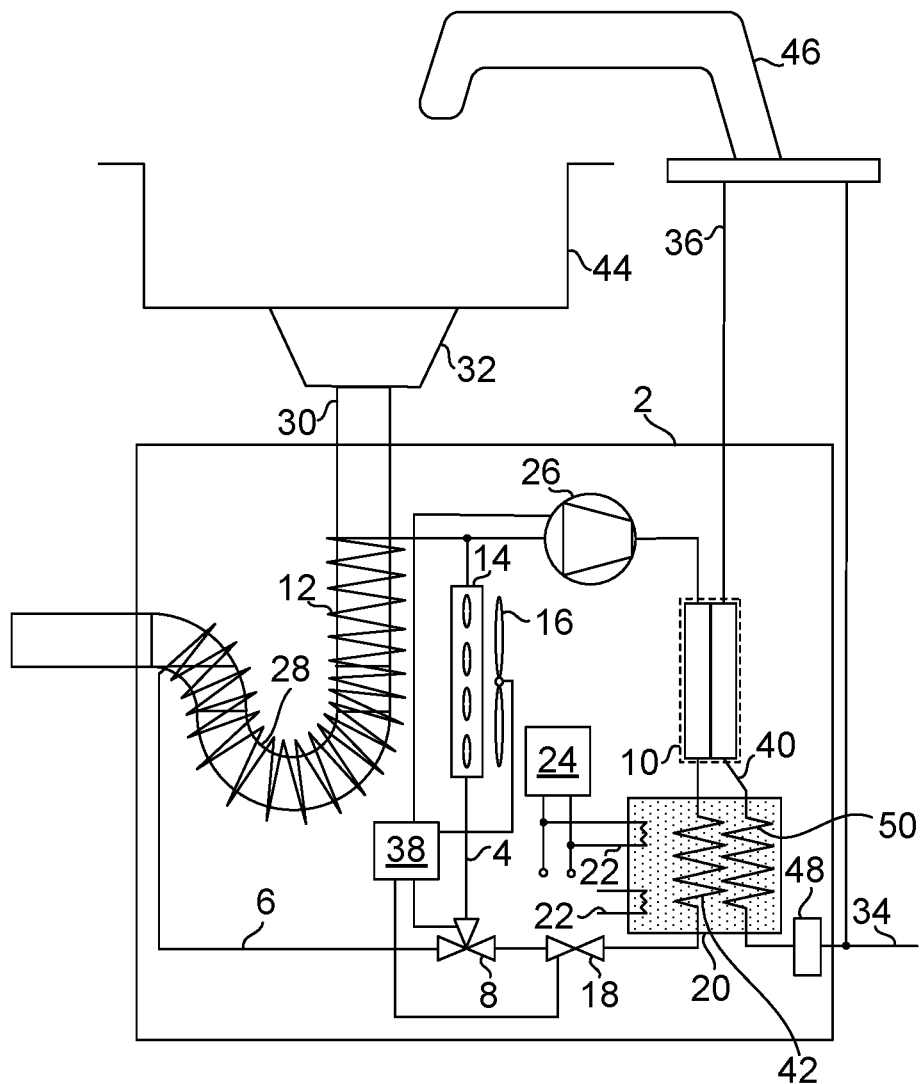
FIG. 2 is a diagram depicting an under sink heating system.

FIG. 1 is a diagram depicting an under sink heating system 2. FIG. 2 is a diagram depicting an under sink heating system 2. It shall be noted that a difference between the embodiment shown in FIG. 1 and the embodiment shown in FIG. 2 lies in the inlet end of the water conductor 40. The embodiment of FIG. 2 shows the inlet end as being disposed through a bath of tank 20 that serves as a thermal battery. A coil 50 is disposed on this inlet end to pre-heat the incoming flow through the water conductor 40 to decrease the thermal transfer gap that is required through heat exchanger 10 from the heat transfer fluid in the first fluid circuit 4 or the second fluid circuit 6. Each heating system 2 includes a water conductor 40, a valve 8, a heat exchanger 14, a blower 16, a coil 12, a final heat exchanger 10 and a controller 38. The water conductor 40 includes an inlet 34 and an outlet 36, the inlet 34 configured for receiving a domestic water flow. The valve 8 is configured to cooperate with a fluid moving device 26 which together are operable to selectively circulate a heat transfer fluid in a first fluid circuit 4 and/or a second fluid circuit 6. In one embodiment, the fluid moving device 26 is a compressor, wherein the heating system 2 further includes an expansion valve 18 fluidly connected to the first fluid conductor 4 and the second fluid conductor. The blower 16 is operable to supply a stream of fluid over the heat exchanger 14, wherein the heat exchanger 14 is fluidly connected to the first fluid circuit 4. Each of the first fluid circuit 4 and the second fluid circuit 6 is essentially a heat pump. The heat pump including a first fluid moving device 26, e.g., compressor, operable to circulate a heat transfer fluid in a first fluid conductor 4 through an evaporator (heat exchanger 14 in the first fluid circuit 4 or coil 12 in the second fluid circuit) where the refrigerant flowing therein expands by absorbing heat from the ambient environment of the heat exchanger 14 as in the case of the first fluid circuit 4 and from the contents of the J bend tube as in the case of the second fluid circuit 6. As expansion valve 18 is disposed upstream of heat exchanger 14 and coil 12, the heat transfer fluid, e.g., refrigerant, flowing therein expands upon passing the expansion valve 18 and before arriving at either heat exchanger 14 or coil 12. As the heat transfer fluid arrives at heat exchanger 10, the heat transfer fluid condenses, giving up heat to the domestic water flow in the water conductor 40.

The heat exchanger 14 is disposed to transfer heat between the heat transfer fluid and the heat exchanger 14, whereby heat is transferred between the heat transfer fluid and the stream of fluid over the heat exchanger 14. The coil 12 is fluidly connected to the second fluid circuit 6, wherein the coil 12 is configured to be disposed on a drainage tube 28, e.g., a J bend drainage tube, to transfer heat between the heat transfer fluid and the coil 12, whereby heat is transferred between the heat transfer fluid and contents of the drainage tube. In one embodiment, the coil 12 is configured to be wrapped around the drainage tube. The coil 12 need not be wrapped around the drainage tube provided that sufficient contact for thermal transmission is made between the two parts. A J bend drainage tube is so-termed as its shape resembles the letter J and it is useful for preventing sewer gases from entering a living space or another indoor space via the drainage tube 28 by having a curved tube portion that traps a small column of effluent 52. The final heat exchanger 10 is configured for thermally coupling the first fluid circuit 4 and the water conductor 40 and the second fluid circuit 6 and the water conductor 40, whereby heat is transferred between the heat transfer fluid to the domestic water flow. In one embodiment, the valve 8 is a 3-way valve which controls whether a refrigerant, e.g., carbon dioxide, etc., flow driven by the fluid moving device 26 flows through the first fluid circuit 4 or the second fluid circuit 6. In on embodiment, the 3-way valve is capable of being modulated. In other words, the 3-away valve can be disposed in a position to allow a flow through both the first and second fluid circuits 4, 6 simultaneously. In one embodiment, the heating system further includes an ozone generator 48 configured for sanitizing the domestic water flow. In the embodiment shown, the ozone generator 48 is disposed at the inlet of the water conductor in order to allow sufficient dwell time for the generated ozone to carry out its function for removing odor and killing bacteria and other pathogens, etc.

If the present heating system 2 is unable to satisfy a hot water demand, in one embodiment, the heating system 2 further includes a thermal battery, an electrical battery 24 or both. A thermal battery is essentially a tank 20 including a bath and a portion 42 of the first fluid conductor 4 or the second fluid conductor 6 disposed through the bath of the tank 20. The portion 42 is essentially a heat exchanger being disposed within the tank 20 to transfer heat between the bath and the heat transfer fluid. In one embodiment, the bath is water. In another embodiment, the bath is a phase change material (PCM).

The price of electricity supply via an electricity grid can vary over the course of a day according to its demand. For instance, during periods of peak demand for electricity and when its supply is insufficient to cover the demand or when its supply barely meets the demand, electricity is priced at a higher level than when the supply well exceeds the demand. Therefore, it may be advantages to utilize electricity from the grid to charge the electric battery 24 in order to store electrical energy in the electric battery 24 in anticipation for later use when grid electricity is more costly. Alternatively and/or additionally, grid electricity can be used to generate heat energy stored in the tank 20 via one or more supplementary heating elements 22 even when there is not an immediate need for hot water when the cost of grid electricity is low. The cost of grid electricity may be observed and analyzed using the controller 38 by receiving grid electricity pricing data, e.g., over the internet.

Figure 3:
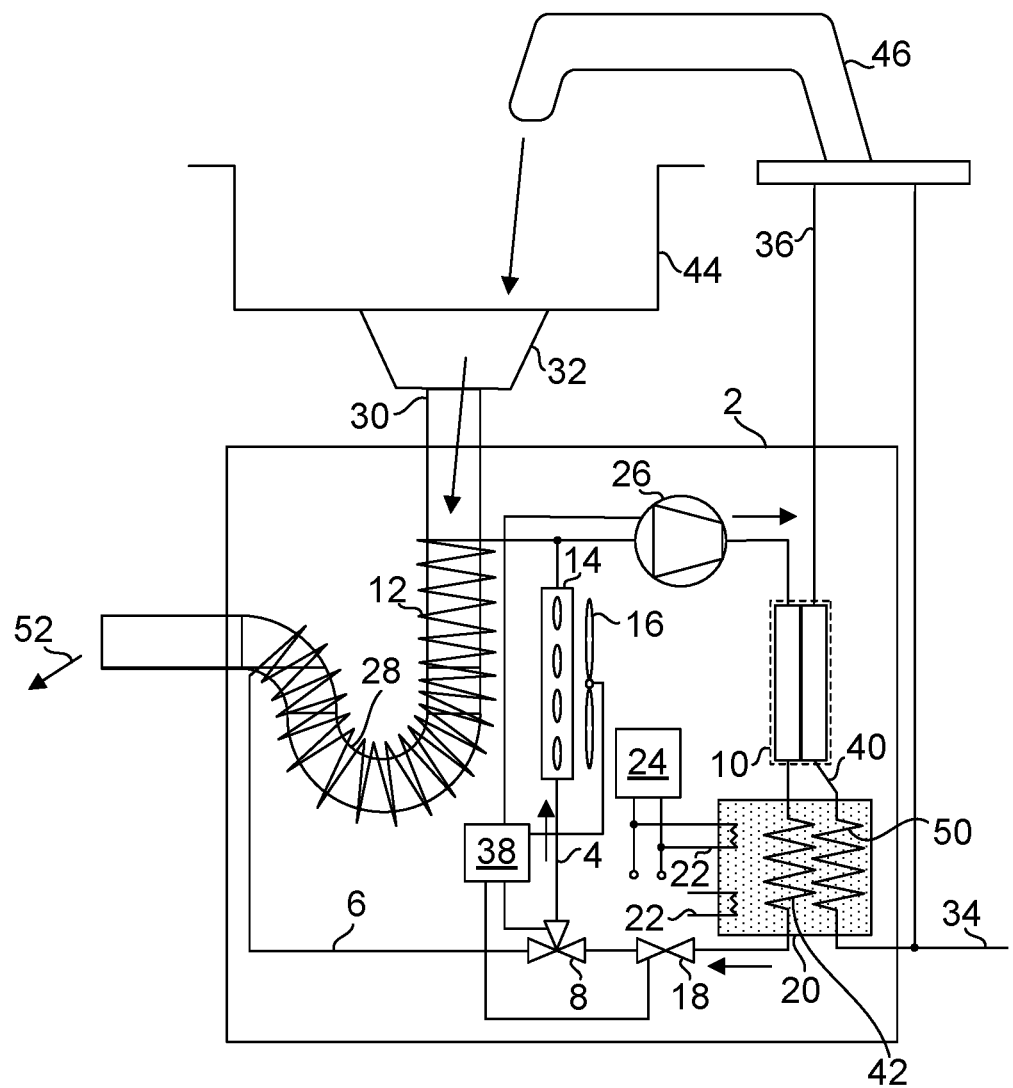
FIG. 3 is a diagram depicting the under sink heating system of FIG. 2 with the fluid moving device active in circulating a refrigerant flow in a circuit configured for extracting heat from the ambient environment under sink.
Figure 4:
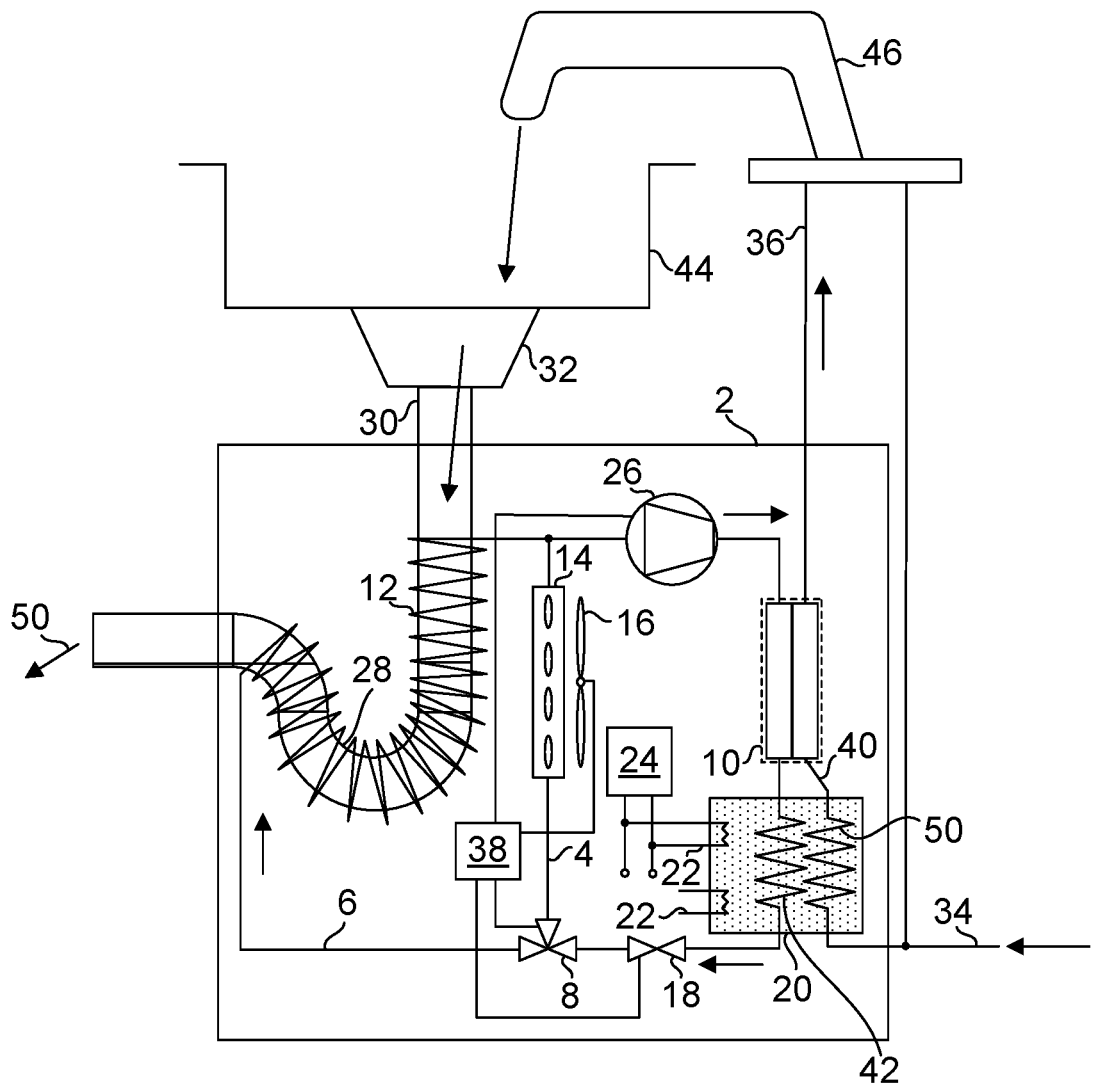
FIG. 4 is a diagram depicting the under sink heating system of FIG. 2 with the fluid moving device active in circulating a refrigerant flow in a coil configured for receiving heat from a J bend drainage tube under sink.

Although operating mode examples are shown with the embodiment of the heating system 2 of FIG. 2 in FIGS. 3 and 4, similar operating modes are applicable to the embodiment of the heating system 2 of FIG. 1. FIG. 3 is a diagram depicting the under sink heating system 2 of FIG. 2 with the fluid moving device active in circulating a refrigerant flow in a circuit configured for extracting heat from the ambient environment under sink. In the operating mode shown in FIG. 3, the controller 38 is operable to control the fluid moving device 26 to circulate the heat transfer fluid in the first fluid circuit 4, the blower 16 and the valve 8 by disposing the valve 8 in a first position in response to a first hot water demand at the faucet 46. Note that heat energy is received from the ambient environment of heat exchanger 14 and transferred to the flow through the water conductor 40. The controller 38 is further operable to control the fluid moving device 26 to circulate the heat transfer fluid in the first fluid circuit 4, the blower 16 and the valve 8 by disposing the valve 8 in a first position in response to a first thermal charging demand when a hot water demand is inactive, e.g., when faucet 46 is turned off.

FIG. 4 is a diagram depicting the under sink heating system of FIG. 2 with the fluid moving device active in circulating a refrigerant flow in a coil 12 configured for receiving heat from a J bend drainage tube 28 under sink 44. A large amount of heat energy remains in an effluent of a hot water demand. When hot water is used, only a small amount of heat energy is extracted by the user or a sink system, e.g., the sink 44 itself, drain tailpiece 30, drain fitting 32, etc. The heat energy not extracted by these components will subsequently follow the effluent 52 to a septic or sewer system, unused and dissipated through the ambient environment of the septic or sewer system. In the operating mode shown in FIG. 4, the controller 38 is operable to control the fluid moving device to circulate the heat transfer fluid in the second fluid circuit 6 and the valve 8 by disposing the valve 8 in a second position in response to a second hot water demand. The controller 38 is further operable to control the fluid moving device 26 to circulate the heat transfer fluid in the second fluid circuit 6, and the valve 8 by disposing the valve 8 in a second position in response to a second thermal charging demand. In both of these operating modes, some heat energy of the effluent 52 through the J bend tube is extracted, preventing the total loss of the remaining heat energy in the effluent. In the embodiment shown, the coil is preferably disposed at least to encompass the portion of the J bend tube where the effluent can collect as the dwell time of this collection of the effluent is the highest, affording the highest heat transfer rate from the effluent 52 to the heat transfer fluid through the second fluid circuit 6.

Figure 5:
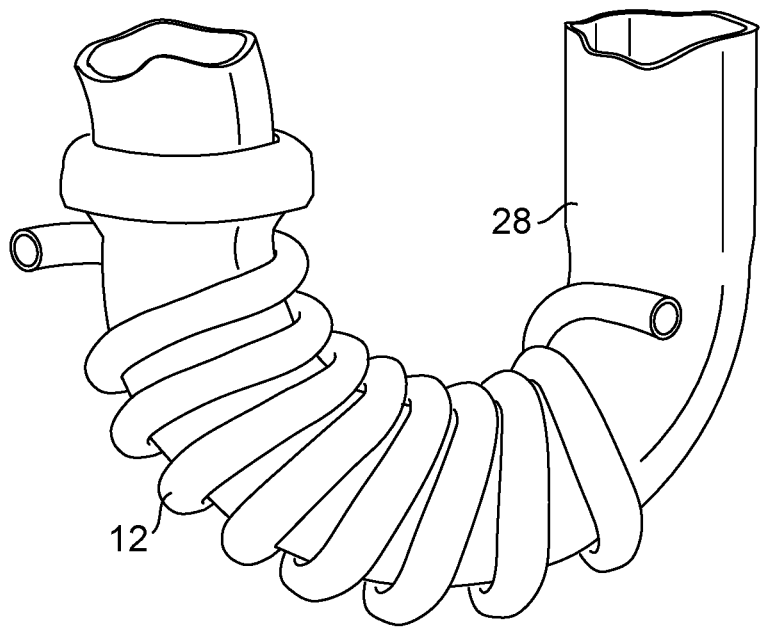
FIG. 5 is a diagram depicting a partial view of a coil disposed on a J bend drainage tube.

FIG. 5 is a diagram depicting a partial view of a coil 12 disposed on a J bend drainage tube 28. The coil 12 is preferably disposed on the J bend tube 28 as tightly as possible, making as much contact with the J bend tube 28 as possible to maximize heat transfer at least via conduction. In one embodiment, the coil 12 is a copper tube and the J bend tube 28 is constructed from a metallic material or another excellent thermal conductor.

Figure 6:
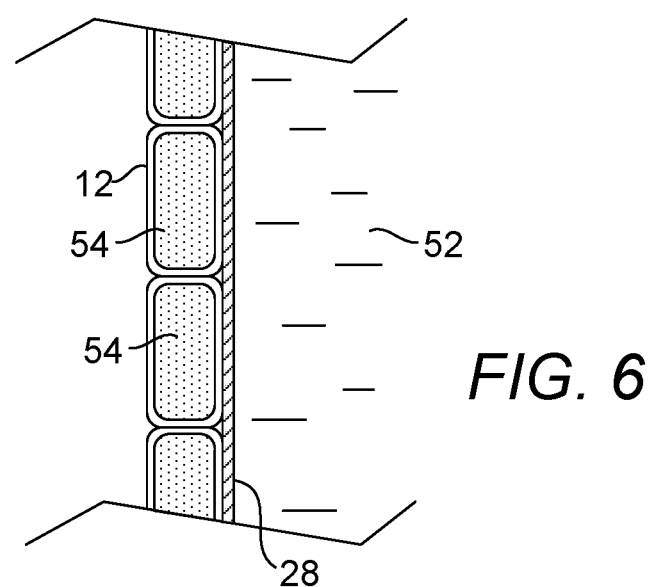
FIG. 6 is a diagram depicting a partial cross-sectional view of a coil disposed on a drainage tube.
Figure 7:
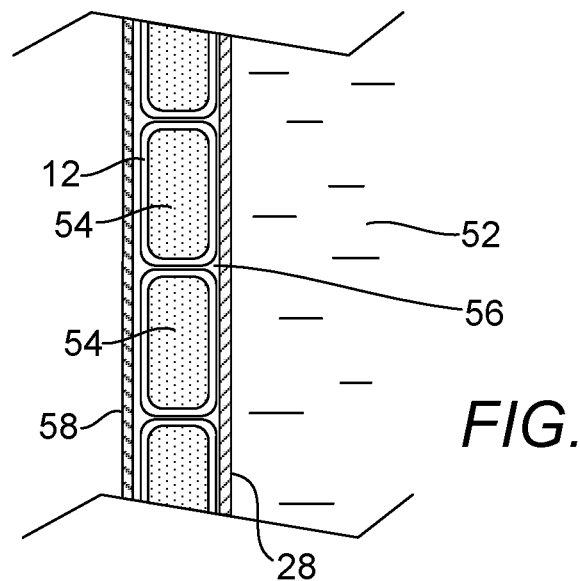
FIG. 7 is a diagram depicting a partial cross-sectional view of a coil disposed on a drainage tube.

FIG. 6 is a diagram depicting a partial cross-sectional view of a coil 12 disposed on a drainage tube 28. It shall be noted that in this embodiment, a coil 12 with rectangular cross-sectional profile is used such that the thermal contact surface area of the coil 12 and the drainage tube 28 can be maximized which in turn causes heat transfer between the effluent 52 and the heat transfer fluid 54 to be maximized. FIG. 7 is a diagram depicting a partial cross-sectional view of a coil 12 disposed on a drainage tube 28. Here, a thermal paste 54 is disposed in the cavities between a coil 12 and a drainage tube 28 to enhance thermal transfer between the effluent 52 and the heat transfer fluid 54 further.

Figure 8:
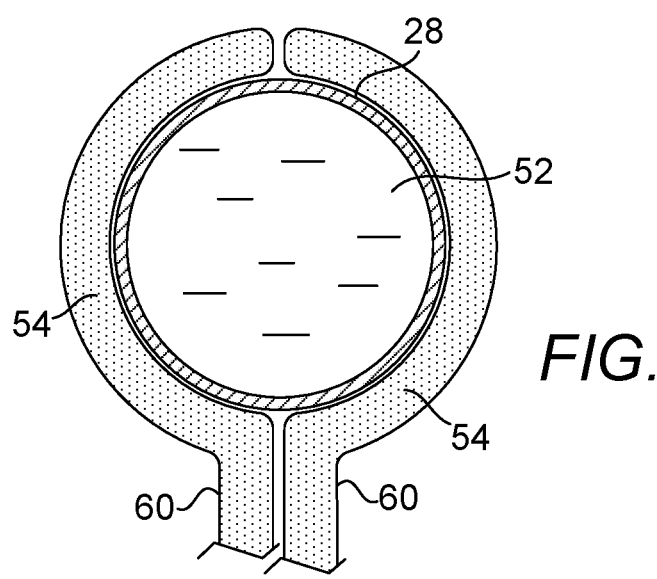
FIG. 8 is a diagram depicting a heat exchanger configuration capable of being clamped onto a drainage tube.

FIG. 8 is a diagram depicting a heat exchanger configuration capable of being clamped onto a drainage tube. Here, the coil 12 is configured in two halves 60 as shown. This configuration allows coil 12 to be applied to a drainage tube 28 without requiring the drainage tube 28 to be inserted through the lumen of the coil 12 in the lengthwise direction of the lumen, making installation of the present heating system and retrofitting of the present coil 12 onto an installed drainage tube 28 easier.

Figure 9:
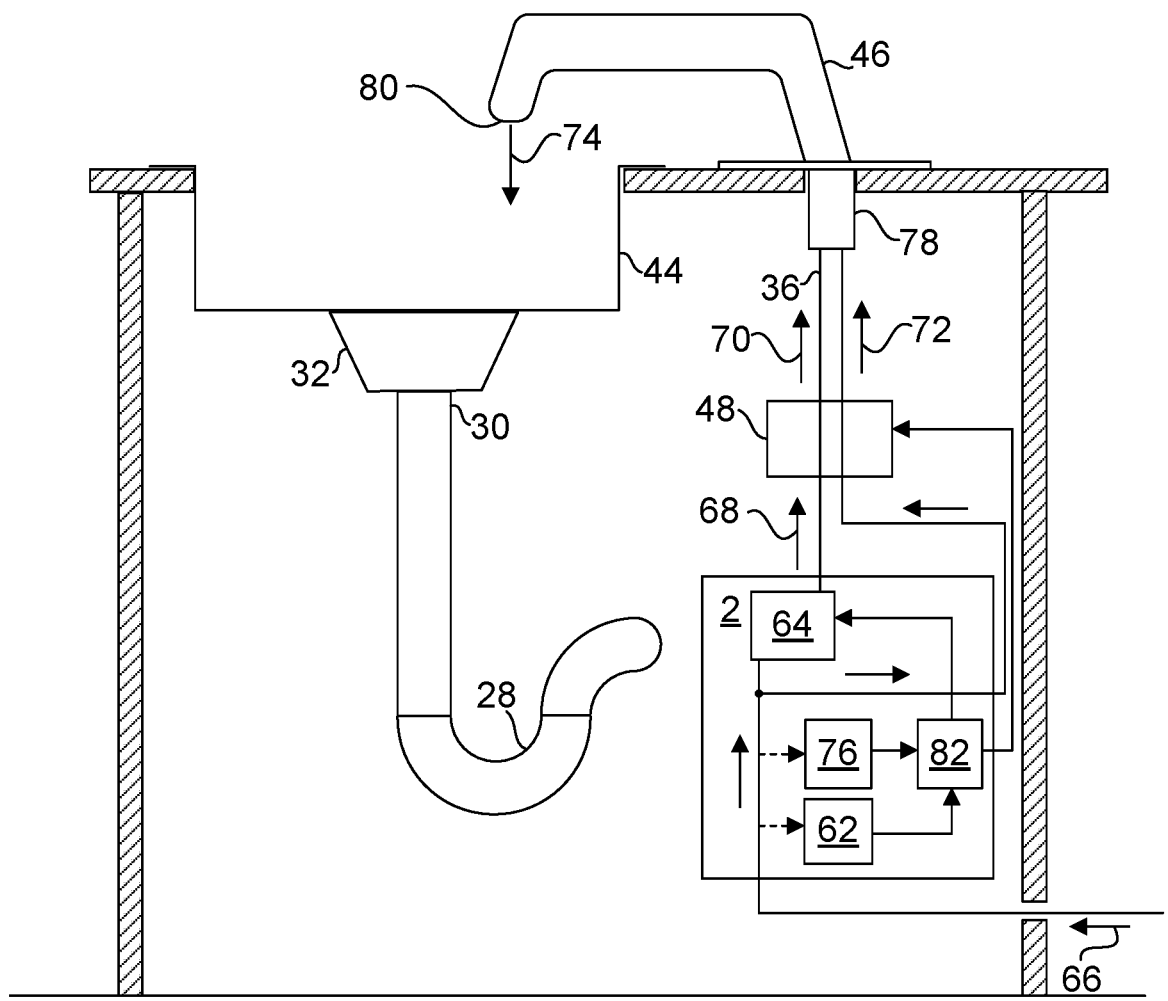
FIG. 9 is a diagram depicting an under sink or compact heating system including a sanitizing system.

FIG. 9 is a diagram depicting an under sink or compact heating system 2 including a sanitizing system. The sanitizing system includes an ozone generator 48 disposed downstream from a heater 64 and a temperature sensor 62. It shall be noted that the temperature sensor 62 is useful for detecting the inlet temperature of the heater 64 or commonly known as the cold water supply. Although a cold water supply is generally disposed at a temperature unsuitable for *Legionella* proliferation, it is possible for the temperature of the cold water supply to be elevated to a temperature that falls within the range of temperature suitable for *Legionella* proliferation, i.e., about 20 degrees C. (68 degrees F.)-50 degrees C. (122 degrees F.). The heater 64 can be an electric heater, a heat pump, a combustion heater or any device capable of raising the temperature of a water flow for hot water, e.g., commercial or residential hot water uses. The sanitizing system includes an ozone generator 48, an ozone demand indicator for determining the existence of a demand for ozone in the water flow and a controller 82. When hot water is requested, an incoming water flow 66 enters the heating system 2 to produce a heated flow 68 which then becomes a sanitized heated flow 70 and a sanitized unheated flow 72 upon exiting the ozone generator 48. Here, the term "ozone generator" is used herein to represent an ozone-producing device and a device or configuration of the ozone generator which aids in providing ozone in a flow. Note that both the heated flow 68 and unheated flow 72 are effectively disposed through the ozone generator 48 before arriving at a faucet 46 where the heated or unheated water flows may be mixed at a mixing valve 78 to achieve a resulting flow 74 with a temperature according to a user's liking. The ozone generator 48 is configured to be disposed no more than about 72 inches upstream of the point of use on a fluid conductor supplying a water flow at the point of use 80 as at such distance, sanitization of the fluid conductor can be ensured as the distance does not provide sufficient dwell time for the generated ozone to break down into oxygen atoms and oxygen molecules which would not provide any sanitization value. Further, as the ozone's half life is rather short, it is beneficial to generate it just in time to be used locally. As an added benefit, an ozone-infused flow further sanitizes the drainage of the sink into which the flow empties, killing the unpleasant odor-causing bacteria. The controller 82 is configured to control the ozone demand indicator and the ozone generator 48 responsive to the ozone demand indicator. In one example, the controller 82 is configured to cause the ozone generator 48 to start generating ozone upon receiving an indication from the ozone demand indicator that the demand for ozone exists and to stop generating ozone upon receiving an indication from the ozone demand indicator that the demand for ozone no longer exists.

In one embodiment, the ozone demand indicator is a flow sensor 76 configured to detect a presence of a water flow. In other words, when a flow occurs, a sanitized flow will be provided at the point of use 80. This embodiment is useful for water usage where the presence of *Legionella* is of great concern and the water flow is sanitized regardless of whether the water flow needs to be sanitized.

In another embodiment, the ozone demand indicator is a timer configured to detect continuous non-existence of the water flow for at least a period of time. In one embodiment, the timer is a part of the services available on the controller. In one embodiment, the at least a period of time is about 1-2 hours. In other words, if no water has been requested from the faucet for at least about 1-2 hours, the demand for ozone now exists during the next use of the faucet. That is, when the faucet is turned on after an inactivity of at least about 1-2 hours, ozone will be produced. In one embodiment, the demand for ozone is based upon a predetermined duration. For instance, if the predetermined duration is 30 seconds, the ozone generator will be turned on for 30 seconds if the request for water at the faucet lasts for this amount of time or an amount of time greater than this amount of time. For a faucet equipped with an electronically-controlled on-off function, sanitization with ozone can occur without a water request. The path downstream from the ozone generator can be sanitized at a schedule not unlike the cadence in sanitization that coincides with manual requests of water as disclosed elsewhere herein.

In yet another embodiment, the ozone demand indicator is a timer configured to detect cumulative non-existence of the water flow for at least a period of time. In one embodiment, the timer is a part of the services available on the controller. In one embodiment, the at least a period of time is about 3-6 hours.

In yet another embodiment, the ozone demand indicator is a temperature sensor configured to detect a temperature of the water flow upstream of a heating system disposed upstream of the ozone generator, that falls within a range of temperature suitable for *Legionella* proliferation.

Figure 10:
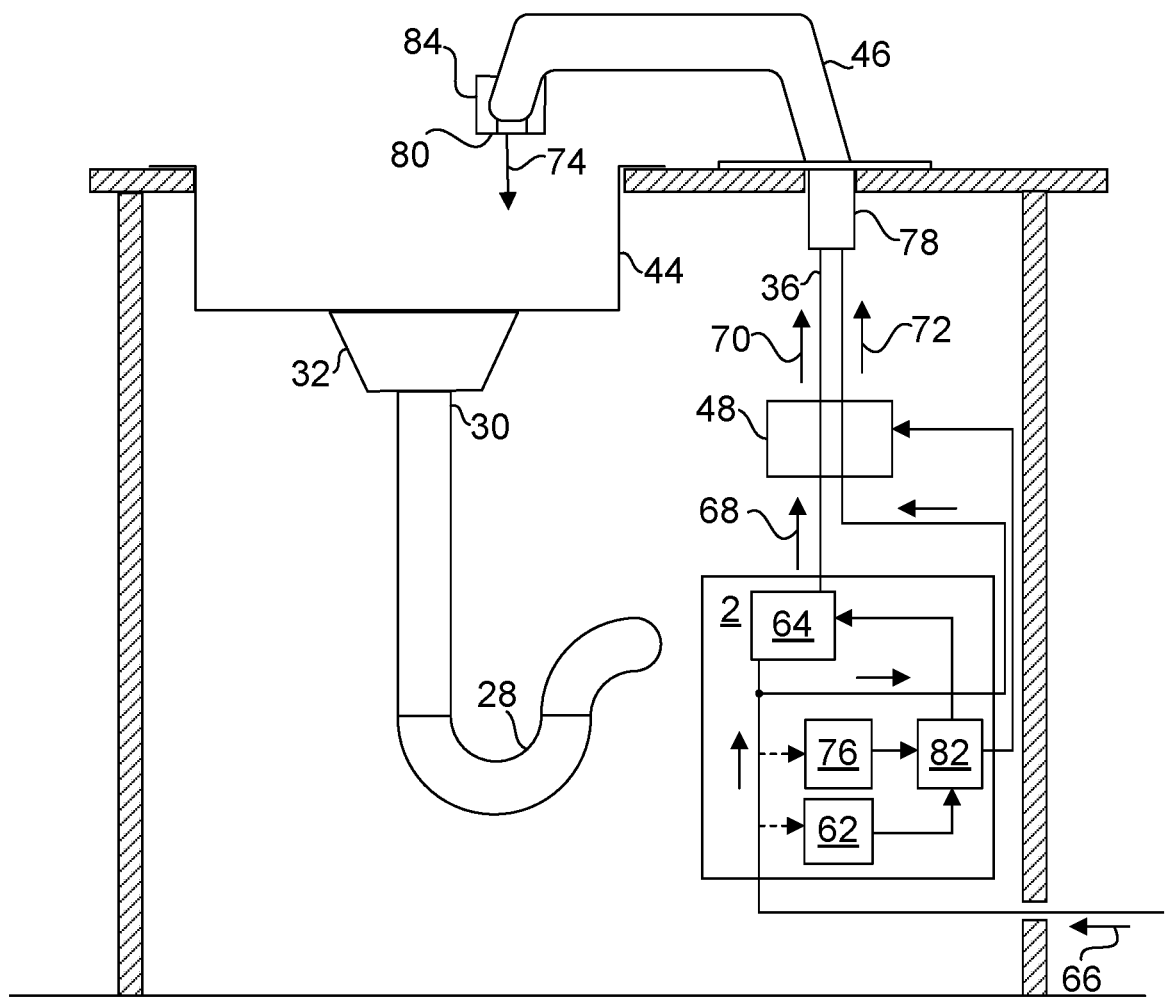
FIG. 10 is a diagram depicting an under sink or compact heating system including a sanitizing system and an ozone sensor.

FIG. 10 is a diagram depicting an under sink or compact heating system including a sanitizing system and an ozone sensor 84. Here, the concentration of ozone at the point of use 80 can be obtained in real time via an ozone sensor 84 which communicates wirelessly with the controller 82. As the ozone concentration is available downstream from the point where ozone is generated, the rate at which ozone is generated at the ozone generator can be adjusted to a suitable value, e.g., to about 2 ppm. If the ozone concentration is determined to be too high at the ozone sensor 84, the rate can be reduced. However, if the concentration is too low to be effective as a sanitizer, the rate can be increased to increase the concentration of dissolved ozone. Excessive ozone production not only wastes energy, degrades the equipment useful for generating ozone and heating, a high concentration of dissolved ozone can also pose danger to the user.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A sanitizing system for sanitizing a water flow at a point of use, wherein the presence of the water flow is indicated by a flow sensor, said sanitizing system comprising:
    (a) an ozone generator configured to be disposed up to about 72 inches upstream of the point of use on a fluid conductor supplying the water flow at the point of use, wherein ozone generated by said ozone generator is configured to be disposed in the water flow to sanitize the water flow; and
    (b) a controller configured for determining the existence of a demand for ozone in the water flow, wherein said controller comprises a timer functionally connected to said sanitizing system, said timer is configured to track a first duration corresponding to a continuous non-existence of the water flow and a second duration corresponding to a cumulative non-existence of the water flow, if said first duration is at least a first period of time, said controller indicates a first existence of a demand for ozone, if said second duration is at least a second period of time, said controller indicates a second existence of a demand for ozone and a demand for ozone is a demand selected from the group consisting of said first existence of a demand for ozone and said second existence of a demand for ozone,
    wherein said controller is configured to cause said ozone generator to start generating ozone upon receiving an indication from said controller that said demand for ozone exists and to stop generating ozone upon receiving an indication from said controller that said demand for ozone no longer exists.

2. The sanitizing system of claim 1, wherein said at least a first period of time is about 1-2 hours.

3. The sanitizing system of claim 1, wherein said at least a second period of time is about 3-6 hours.

4. The sanitizing system of claim 1, further comprising an ozone sensor configured to obtain an ozone concentration level at the point of use such that a rate at which ozone is generated by said ozone generator can be adjusted based on said ozone concentration level.

5. A heating system comprising:
    (a) a water conductor comprising an inlet and an outlet, said inlet configured for receiving a water flow, the presence of which is indicated by a flow sensor;
    (b) a heater comprising an inlet and an outlet, said heater configured to be interposed between said inlet of said water conductor and said outlet of said water conductor;
    (c) an ozone generator configured to be interposed between said outlet of said heater and said outlet of said water conductor and disposed such that an outlet of said ozone generator and said outlet of said water conductor is up to about 72 inches, wherein ozone generated by said ozone generator is configured to be disposed in the water flow to sanitize the water flow; and
    (d) an controller configured for determining the existence of a demand for ozone in the water flow, wherein said controller comprises a timer functionally connected to said sanitizing system, said timer is configured to track a first duration corresponding to a continuous non-existence of the water flow and a second duration corresponding to a cumulative non-existence of the water flow, if said first duration is at least a first period of time, said controller indicates a first existence of a demand for ozone, if said second duration is at least a second period of time, said controller indicates a second existence of a demand for ozone and a demand for ozone is a demand selected from the group consisting of said first existence of a demand for ozone and said second existence of a demand for ozone,
    wherein said controller is configured to cause said ozone generator to start generating ozone upon receiving an indication that said demand for ozone exists from said controller and to stop generating ozone upon receiving an indication from said controller that said demand for ozone no longer exists.

6. The heating system of claim 5, wherein said at least a first period of time is about 1-2 hours.

7. The heating system of claim 5, wherein said at least a second period of time is about 3-6 hours.

8. The heating system of claim 5, further comprising an ozone sensor configured to obtain an ozone concentration level at said outlet of said water conductor such that a rate at which ozone is generated by said ozone generator can be adjusted based on said ozone concentration level.

\* \* \* \* \*